A. M. LANCE.
NUT LOCK.
APPLICATION FILED NOV. 16, 1909.
969,543.
Patented Sept. 6, 1910.
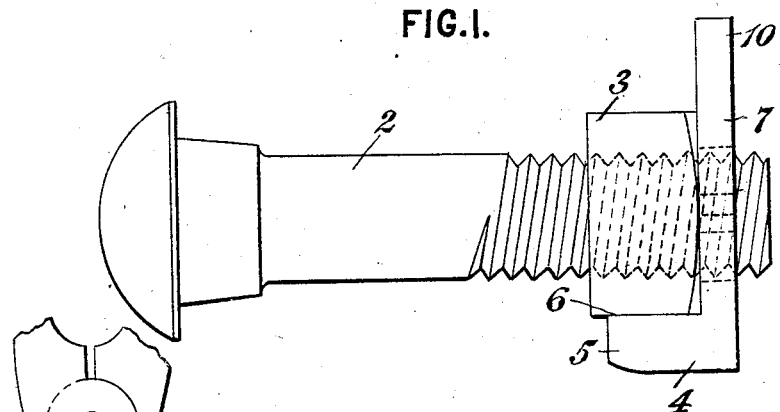
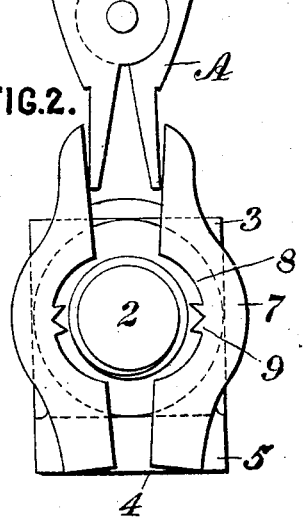
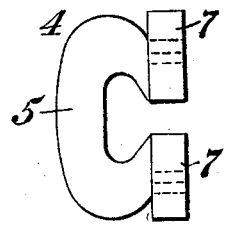
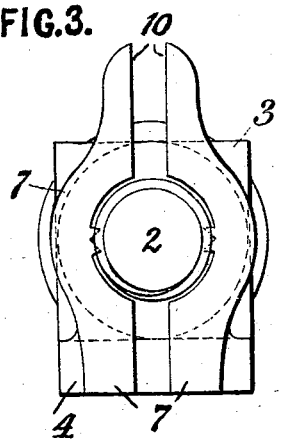
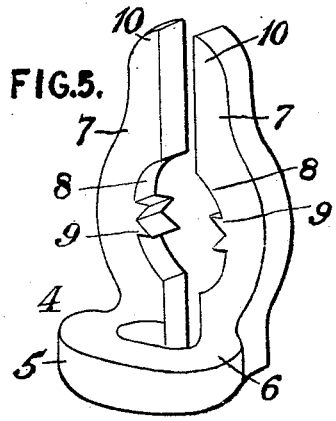
Witnesses:
F. E. Gaither
Ella M. Connell
Inventor:
A. M. Lance,
By Nesbit
Attorney.

UNITED STATES PATENT OFFICE.

ANDREW M. LANCE, OF BATSON, TEXAS.

NUT-LOCK.

969,543.  Specification of Letters Patent.  Patented Sept. 6, 1910.

Application filed November 16, 1909. Serial No. 528,319.

*To all whom it may concern:*

Be it known that I, ANDREW M. LANCE, a resident of Batson, in the county of Hardin and State of Texas, have invented certain new and useful Improvements in Nut-Locks, of which the following is a specification.

The primary object of this invention is to provide a resilient nut locking device of simple, strong and durable construction, one that can be readily applied to the various forms of nuts and bolts commonly used.

The invention includes a locking member that will not work loose or be injuriously affected when subjected to a sudden shock or series of prolonged vibrations, and one which will retain its efficiency after long usage or after having been removed and readjusted a number of times either in its original or in a different use.

The invention consists in certain novel features of construction, and in the assemblage and combination of parts, hereinafter fully described and claimed, and illustrated in preferred form in the accompanying drawings, wherein—

Figure 1 is a side elevation of a nut lock embodying my invention. Fig. 2 is an end view, illustrating the mode of placing the lock on a bolt and nut. Fig. 3 a similar view with the parts locked together. Fig. 4 a top plan of the locking member. Fig. 5 a perspective view of the locking member.

Referring to the drawings, 2 is the bolt, 3 the nut, and 4 the locking member. The latter is preferably formed of resilient material, and is provided with a C-shaped body portion 5, having a flat inner face 6, adapted to bear closely against one face of the nut 3 when in operative position. The ends of the body portion are turned up at approximately right angles to body 5 to form gripping arms 7. The adjacent faces of said arms are curved at 8 to encircle the bolt 3, and are provided with inwardly extending teeth 9, adapted to bite into and grip the threads at opposite sides of the bolt, as shown in Fig. 3. The arms 7 extend beyond bolt 3 and their adjacent faces 10, are spaced apart to permit of the insertion of a tool for forcing them apart sufficiently to allow the locking member to be slipped on and off the bolt. A convenient form of pincer-like tool for this purpose is shown at A, Fig. 2, but it will be noted that arms A may be sprung apart in any suitable manner.

In the operation of my device, after nut 3 has been adjusted upon the bolt, the locking member 4 is sprung open, as Fig. 2, and slipped over the bolt until body portion 5 and arms 7 bear closely against nut 3. The arms 7 are then released and allowed to resume their normal position, forcing teeth 9 firmly against the bolt threads. The flat face 6 of the locking member being in close contact with one of the faces of the nut, the latter is prevented from turning in either direction upon the bolt, and the parts of the device are locked firmly together. Obviously, a reversal of the above operation will release the locking member without in any way impairing its efficiency or unfitting it for further use.

I claim:

A nut lock formed of a single piece of metal having its intermediate portion forming the permanent C-shaped body portion having a flat inner face to engage the side of a nut, resilient arms 7 extended from the extremities of the body at right angles to said flat face, the inner faces of the arms— inwardly from their outer extremities— curved and normally spaced apart to impinge the embraced bolt in a plane at right angles to the flat nut-holding face of the body, the outer extremities of the resilient arms extended to receive an expanding tool, substantially as described.

In testimony whereof I affix my signature in presence of two witnesses.

ANDREW M. LANCE.

Witnesses:
M. S. MICHAEL,
J. A. PEAL.